June 4, 1968 — R. F. BARTHELEMY — 3,386,278
DEADLOAD SIMULATOR
Filed Jan. 20, 1966
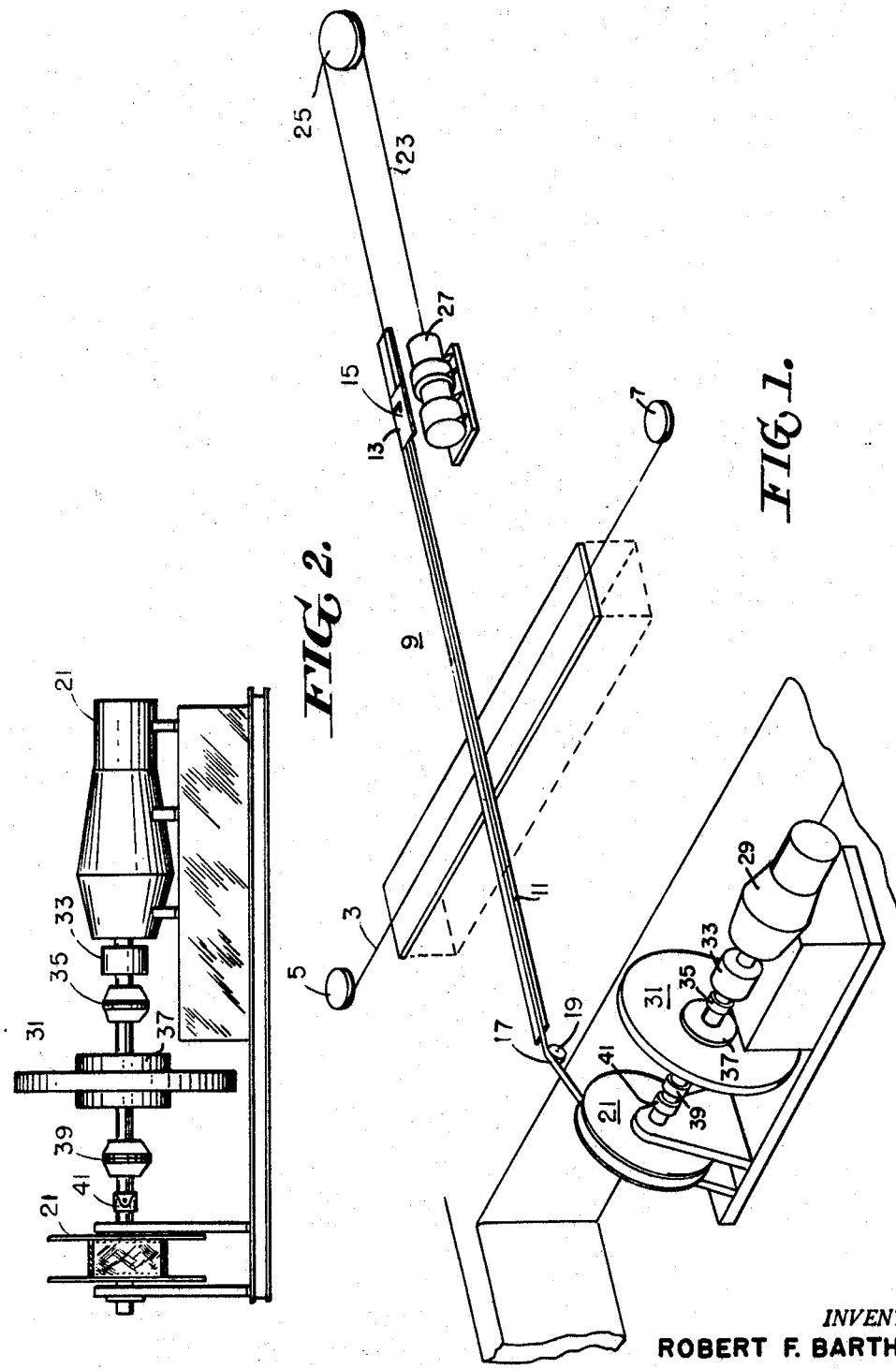
INVENTOR.
ROBERT F. BARTHELEMY
BY
Arthur L. Collins
ATTORNEY

United States Patent Office 3,386,278
Patented June 4, 1968

---

3,386,278
DEADLOAD SIMULATOR
Robert F. Barthelemy, Lafayette Hill, Pa., assignor to the United States of America as represented by the Secretary of the Navy
Filed Jan. 20, 1966, Ser. No. 521,997
1 Claim. (Cl. 73—11)

ABSTRACT OF THE DISCLOSURE

The subject invention relates to unique apparatus for simulating the movement and impact of large translational live or dead loads on aircraft arresting gear to be evaluated under varying test conditions. The improved apparatus utilizes the kinetic energy of a large rotating flywheel device which wraps an elongated tow tape about a clutch connected capstan and, in doing so, draws an attached shuttle and hook assembly into the arresting gear under test.

---

The invention described herein may be manufactured and used by or for the Government of the United States of America for governmental purposes without the payment of any royalties thereon or therefor.

The present invention relates to novel and improved apparatus for testing gear adapted to control or arrest the movement of objects of substantial mass traveling at predetermined velocities within a prescribed area. More particularly, it relates to novel and improved apparatus that simulates a live or dead load in the test of aircraft arresting equipment.

Aircraft arresting equipment must ordinarily undergo exhaustive tests of many kinds before it can be approved for use and installed on an aircraft carrier or other emergency or limited area aircraft landing strip. Various methods and procedures have been used in the past to propel live as well as dead load devices along elongated runways prior to engagement with arresting equipment to be evaluated. Considerable difficulty, however, has been experienced in the use of such arresting gear test equipment.

It is, therefore, a principal object of the present invention to provide novel and improved apparatus for evaluating the efficiency and reliability of translational mass arresting equipment.

It is a further object of the present invention to provide novel and improved arresting gear test apparatus which includes no large translational mass that can escape and become a hazard to life and property.

It is a further object of the present invention to provide novel and improved arresting gear test apparatus which can be recycled readily and rapidly.

It is a further object of the present invention to provide novel and improved arresting gear test apparatus which is less costly to construct and operate and which requires a test site area of minimal size.

Other objects and many of the attendant advantages of this invention will be readily appreciated as the same becomes better understood by reference to the following detailed description when considered in connection with the accompanying drawing wherein:

FIG. 1 is a perspective view of a preferred embodiment of the present invention.

FIG. 2 is a diagrammatic view of the rotational energy generating apparatus shown in FIG. 1.

A preferred embodiment of the invention is illustrated in FIGS. 1 and 2 of the drawing. As shown therein, the pendant 3 of the arresting gear to be tested extends between the deck sheaves or the like 5 and 7 across the prescribed arresting area or runway 9. The shuttle guide track 11 is anchored or secured in any suitable manner to the runway 9 and extends perpendicularly predetermined distances in front of and beyond the arresting pendant 3. The shuttle 13 with its integrally attached pendant engaging hook 15 is slidably disposed in the guide track 11 in any suitable conventional manner. The tow tape or the like 17 which preferably consists of one or more steel ribbons of suitable size and cross sectional configuration is attached to one end to the shuttle 13. The tape extends forwardly as shown over guide roller 19 and about the tape drum or capstan 21 and is secured at its opposite end in any suitable manner to the hub of the capstan 21. The nylon rope retractor cable 23 is also secured to the shuttle 13 and extends rearwardly about guide roller 25 to the electric motor or other suitable retraction motor 27.

The conventional gas turbine engine 29 provides the energy necessary to drive the arresting gear dead load simulator of the invention. The output shaft of the gas turbine engine 29 is connected as shown to the flywheel 31 of predetermined mass through the reduction gear mechanism 33 and the flexible adaptor 35. The flywheel 31 is similarly connected to the clutch mechanism 37 and the flexible adaptor 39. Flexible adaptors 35 and 39 permit minor variations in the alignment of the interconnecting rotating elements and also reduce the development of destructive stress induced in the clutch, the flywheel and the engine by centrifugal differential growth. The clutch mechanism 37 which is preferably pneumatically actuated is coupled to the capstan 21 through the flexible adaptor 39 and the universal coupling mechanism 41.

In operation, the shuttle 13 is first retracted by retraction motor 27 and nylon cable 23 to a predetermined firing position in front of the arresting gear pendant 3. The flywheel 31 of predetermined mass is then brought up to speed by the gas turbine engine 29 until it together with the other elements of the drive system represents the kinetic energy and translational velocity of a predetermined dead load mass. Suitable variations in the magnitude of the simulated dead load mass are obtained by changing the flywheel mass, its angular velocity or the mechanical advantage of the drive system. When the flywheel 31 is rotating at a preselected velocity, clutch 37 is engaged and shuttle 13 moves toward the arresting pendant 3 at the selected velocity with predetermined translational inertia. When the hook 15 on shuttle 13 engages pendant 3, performance of the arresting gear equipment coupled to the pendant may be evaluated for the preselected load arrestment. The shuttle 13 is then again returned to its firing position by retraction engine 27 for arrestment under similar or other selected simulated dead load conditions.

Obviously, many modifications and variations of the present invention are possible in the light of the above teachings. It is, therefore, to be understood that within the scope of the appended claim, the invention may be practiced otherwise than as specifically described.

What is claimed is:

1. A dead load simulator for use in testing arresting gear, said simulator comprising:
   (a) a massive flywheel which is driven by a turbine engine;
   (b) a capstan;
   (c) means for coupling the capstan to the rotating mass for rotation therewith;
   (d) a shuttle having a hook which is adapted to engage the arresting gear to be tested;
   (e) and means wrapped about the capstan and connected to the shuttle such that on rotation of the capstan, the hook on the shuttle is drawn into engagement with the arresting gear.

References Cited

UNITED STATES PATENTS

| | | | |
|---|---|---|---|
| 1,415,847 | 5/1922 | Sperry | 244—63 |
| 2,390,677 | 12/1945 | Alkan | 244—63 |
| 2,926,872 | 3/1960 | Fulton | 244—63 |
| 3,163,380 | 12/1964 | Brodie | 244—63 |
| 3,228,630 | 1/1966 | Byrne | 244—63 |

FOREIGN PATENTS 1,190,224   5/1960   Germany.

RICHARD C. QUEISSER, *Primary Examiner.*

JAMES GILL, *Examiner.*

D. SCHNEIDER, V. J. TOTH, *Assistant Examiners.*